United States Patent

Kume et al.

Patent Number: 5,664,295
Date of Patent: Sep. 9, 1997

[54] HOSE CLAMP

[75] Inventors: Masato Kume, Kariya; Kiyoshi Oshima, Anjo, both of Japan

[73] Assignees: Toyoda Boshoku Corporation, Kariya; Nippondenso Co., Ltd., Kariya, both of Japan

[21] Appl. No.: 527,332

[22] Filed: Sep. 12, 1995

[30] Foreign Application Priority Data

Sep. 13, 1994 [JP] Japan .................... 6-219002

[51] Int. Cl.$^6$ ........................... B65D 63/02
[52] U.S. Cl. ................ 24/20 R; 251/4; 24/20 CW
[58] Field of Search ................ 24/20 R, 20 EE, 24/20 TT, 206 W, 283, 279, 280, 19; 285/236, 412, 253, 407, 420; 251/4, 5, 6; 248/75, 316.1, 316.4

[56] References Cited

U.S. PATENT DOCUMENTS

| 4,380,096 | 4/1983 | Nishida et al. | 24/20 R |
|---|---|---|---|
| 4,930,191 | 6/1990 | Takahashi et al. | 24/20 R |
| 4,951,363 | 8/1990 | Takahashi et al. | 24/20 R |
| 5,145,218 | 9/1992 | Worley et al. | 24/19 X |
| 5,414,905 | 5/1995 | Kimura et al. | 24/20 R |
| 5,459,906 | 10/1995 | Detable et al. | 24/20 R |

FOREIGN PATENT DOCUMENTS 4-194486  7/1992  Japan .

*Primary Examiner*—Peter M. Cuomo
*Assistant Examiner*—Robert J. Sandy
*Attorney, Agent, or Firm*—Oblon, Spivak, McClelland, Maier & Neustadt, P.C.

[57] ABSTRACT

A hose clamp includes a clamping main body and a fixing member. The clamping main body is formed as a circled-strip having opposite free ends so as to be capable of exhibiting an urging force for reducing its diameter, and clamps a hose member having a concavity at an end thereof. The fixing member is engaged with the opposite free ends of the clamping main body so as to inhibit the diameter of the clamping main body from reducing, and includes a projection extending at least in one of axial directions of the hose member, and being capable of engaging with the concavity of the hose member so as to position the clamping main body in a direction around the axis of the hose member. Thus, in a direction around the axis of the hose member, the clamping main body is positioned by the projection of the fixing member which is disposed independently of the clamping main body. Accordingly, even when the diameter of the hose member is varied, the width, thickness, etc. of the clamping main body can be kept at a predetermined dimension. Therefore, the clamping main body can be manufactured out of a common strip-shaped material.

15 Claims, 4 Drawing Sheets ( PRIOR ART )

1

HOSE CLAMP

BACKGROUND OF THE INVENTION

1. Field of the Invention

The present invention relates to a hose clamp for clamping automotive air cleaner hoses, oil hoses, or the like.

2. Description of Related Art

A hose member, such as an automotive air cleaner hose, is formed by blow molding elastic polymer (e.g., NBR, CR, EPDM, soft PP, etc.). It is then installed to a mating member (e.g., an air cleaner, a throttle body, etc.), and tightened to the mating member by a hose clamp so as to establish the sealing between itself and the mating member.

Heretofore, there have been proposed a variety of conventional hose clamps for engaging the hose member with the mating member. For example, as illustrated in FIG. 6, a conventional hose clamp 21 includes a strip-shaped clamping main body 25, and a screw 26. The clamping main body 25 includes a tubular portion 22 having a female-threaded hole, and disposed at one of the opposite ends, and a retractable allowance portion 24 disposed at the other one of the opposite ends. The retractable allowance portion 24 includes an array of grooves 23 which are disposed in a length-wise direction of the clamping main body 25, and which are disposed at intervals equal to the pitches of the female thread formed in the tubular portion 22. The screw 26 is fitted into the female-threaded hole of the tubular portion 22, and is meshed with the array of grooves 23.

The conventional hose clamp 21 is disclosed in Japanese Patent Publication (KOKAI) No. 4-194,486. Prior to service, the screw 26, working as an operating member, is loosened so as to enlarge the diameter of the clamping main body 25. Thus, the entire hose clamp 21 is temporarily placed at one of the opposite ends of a hose member. After engaging the hose member with a mating member at one of the opposite ends, the screw 26 is rotated so as to advance its meshing with the array of grooves 23. Thus, the diameter of the clamping main body 25 is reduced, and the hose member is tightened against the mating member at one of the opposite ends.

Note that the clamping main body 25 of the conventional hose clamp 21 is provided with engager portions 25a (e.g., a concaved portion), 25b (e.g., a convexed portion). The engager portions 25a, 25b are disposed away from the screw 26, and have different configurations, for instance, in a width-wise direction of the clamping main body 25 (i.e., an axial direction of a hose member). When the hose clamp 21 is temporarily placed at one of the opposite ends of a hose member, these engager portions 25a, 25b are engaged with engagee portions which are formed on the hose member, thereby positioning the hose clamp 21 and inhibiting it from moving in the circumferential direction (i.e., in a direction around the axis of the hose member). Thus, the screw 26 is placed in advance at a specified position with respect to the hose member. As a result, the subsequent tightening operation can be carried out with ease.

The conventional hose clamp 21 includes the clamping main body 25 which is provided with the engager portions 25a, 25b so as to ease the positioning operation of the operating member (i.e., the screw 26) for the subsequent tightening operation. Hence, it is possible to securely place the operating member at the position where the tightening operation can be carried out with ease. On the contrary, the engager portions 25a, 25b are placed at the positions where they are hardly identified visually. As a result, the engager portions 25a, 25b are kept away from aligning with the engagee portions of the hose member, and thereby the tightening operation might be carried out faultily. If such is the case, after the faulty tightening operation, an operator who notices the failure should loose the screw 26, or the operator should release the free opposite ends so that the operator can modify the position of the clamping main body 25 to an appropriate position, and thereafter the operator should carry out the tightening operation again.

Further, when the diameter of the hose member is varied, it is necessary, in the conventional hose clamp 21 described above, to correct the specifications of the clamping main body 25 in order to change the positions of the engager members 25a, 25b.

Furthermore, since every hose member is provided with its own engagee portions whose axial length varies, the specifications of the clamping main body 25 should meet not only the variation in the diameter of the hose member but also the variation in the axial length of the engagee portions thereof.

Moreover, these problems stemming from the conventional hose clamp 21 similarly arise in a conventional spring-type hose clamp whose clamping main body exerts an urging force for reducing its diameter around its axis when the clamping main body is provided with engagee portions.

SUMMARY OF THE INVENTION

The present invention has been developed in view of the aforementioned circumstances. It is therefore an object of the present invention to provide a hose clamp which enables to inhibit faulty tightening, and to easily carry out the positioning of its clamping main body. A hose clamp according to the present invention can obviate to change the specifications of its clamping main body in responsive to the variation in the diameter of a hose member as well as the variation in the axial length of engagee portions thereof by providing an engager member (or a projection) on its operating member for tightening. The engager member works as an element for positioning the clamping main body in a direction around an axis of a hose member.

As shown in FIGS. 1 to 3, a method for using the hose clamp (tightening operation) is as follows. The fixing member (4) is previously connected to one of the opposite free ends of the clamping main body (minor-width portion 3a). When the clamping main body clamps the hose member (2), the diameter of the clamping main body is enlarged by holding both of the opposite free ends with a tool such as a spanner in order that one of the opposite free ends (minor-width portion 3a) is approached to the leading end of the other one of the opposite free ends (3b). The hose member (2) is inserted into the clamping main body whose diameter is enlarged. Before separating both of the opposite free ends, the projection (5) of the fixing member (4) is engaged with the groove (2a) which is previously formed in the hose member (2).

In a first aspect of the present invention which enables to solve the above-described problems, a hose clamp comprises:

a clamping main body for clamping a hose member having a concavity, the clamping main body disposed around a hose member about an axis of the hose member, being capable of exhibiting an urging force for reducing its diameter, and formed as a circled-strip having opposite free ends;

a fixing member disposed independently of the clamping main body, engaged with the opposite free ends of the clamping main body so as to inhibit the diameter of the clamping main body from reducing, and including a projection;

the projection extending at least in one of axial directions of the hose member, and being capable of engaging with the concavity of the hose member so as to position the clamping main body in a direction around the axis of the hose member.

In the first aspect of the present invention, the clamping main body tightens the hose member with an urging force. The urging force is exerted in a direction around the axis of the hose member so as to reduce the diameter of the clamping main body. The fixing member inhibits the diameter of the clamping main body from reducing, thereby enabling to temporarily install the clamping main body around the hose member. The projection, disposed on the fixing member, engages with the concavity of the hose member, thereby enabling to position the clamping main body in a direction around the axis of the hose member.

In the first aspect of the present invention, regardless of the variation in the diameter of the hose member, the projection (i.e., a portion working as an engager) of the fixing member can be positioned at a specified position. When the projection is engaged with the concavity of the hose member, the clamping main body is positioned in a direction around the axis of the hose member. Thus, the fixing member can be placed at a position, where an operator can easily carry out the subsequent operation, with remarkable ease, and thereby the present hose clamp can be prevented from being tightened faultily.

Moreover, since the fixing member is an element which is disposed independently of the clamping main body, the clamping main body can be made from a strip-shaped material having a constant width; namely: it can be formed by cutting a strip-shaped material having a constant width to a specific length in accordance with a diameter of a hose member. Thus, the specifications of the clamping main body can be standardized.

In the first aspect of the present invention, the fixing member can further include: a major portion to be installed to at least one of the opposite free ends of the clamping main body, and a tongue portion extending from the major portion in a direction around the axis of the hose member and to be engaged with the other one of the opposite free ends of the clamping main body.

Specifically, the fixing member is installed to one of the opposite free ends of the clamping main body at the major portion, and it is engaged with the other one of the opposite free ends thereof at the tongue portion. Thus, the clamping main body is kept in a prior-to-tightening state where it is inhibited from decreasing its diameter, and thereby it can be held temporarily at a position around a hose member where an operator can carry out the subsequent operations with ease.

For instance, an operator tightens the present hose clamp around a hose member in the following manner: an operator fits a mating member into a hose member, and thereafter the operator disengages the tongue portion from the other one of the opposite free ends of the clamping main body. Thus, the urging force resulting from the diameter-reducing clamping main body is exerted to the hose member, and thereby the hose member is tightened around the mating member.

In the first aspect of the present invention, the fixing member can further include: opposite lip for holding the opposite free ends of the clamping main body therebetween.

Specifically, the opposite lip of the fixing member hold the opposite free ends of the clamping main body therebetween. Thus, the clamping main body is kept in a prior-to-tightening state where it is inhibited from decreasing its diameter. Then, an operator can tighten a hose member around a mating member by simply removing the fixing member against a frictional force which results from the urging force exerted by the diameter-reducing clamping main body.

As having been described so far, in accordance with the first aspect of the present invention, the present hose clamp comprises the clamping main body, and the fixing member. The clamping main body tightens the hose member by the urging force which results from the reduction of its diameter around the axis of the hose member. Prior to the tightening operation, the fixing member keeps the diameter of the clamping main body from reducing, and it includes the projection which engages with the concavity of the hose member so as to position the clamping main body in a direction around the axis of the hose member. Thus, the fixing member, disposed independently of the clamping main body, enables to position the clamping main body in a direction around the axis of the hose member, and allows to obviate to vary the specifications of the clamping main body in responsive to the hose-member-diameter variation.

Further, in accordance with a modified version of the first aspect of the present invention, the hose member can be installed temporarily by a simple operation; namely: by installing the major portion of the fixing member to one of the opposite free ends of the clamping main body, and by engaging the tongue portion of the fixing member with the other one of the opposite free ends of the clamping main body. Thus, the subsequent tightening operation can be carried out with ease.

Furthermore, in accordance with another modified version of the first aspect of the present invention, the fixing member is constituted so as to hold the opposite free ends of the clamping main body between its opposite lip, thereby keeping the diameter of the clamping main body from reducing prior to the tightening operation. Thus, the hose-member-tightening operation can be so simplified that it can be completed by removing the fixing member against a frictional force which results from the urging force exerted by the diameter-reducing clamping main body.

Still, in a second aspect of the present invention, a hose clamp for clamping a hose member comprises:

a clamping main body formed by winding a strip-shaped steel in a circle shape more than once, and having opposite free ends;

a fixing member for inhibiting the opposite free ends of the clamping main body from separating, and including:

a major portion to be installed to one of the opposite free ends of the clamping main body, and having a width which is larger than a strip-width of the clamping main body; and a tongue portion extending from the major portion in a direction around an axis of a hose member, and including an engager hole to be engaged with the other one of the opposite free ends of the clamping main body.

Still further, in a third aspect of the present invention, a hose clamp, disposed on an outer periphery of a hose member and being tightened against the hose member outer periphery, comprises:

a clamping main body formed by winding a strip-shaped steel in a circle shape more than once, and having opposite free ends and a predetermined width, the clamping main body including one of the opposite free ends which is bent outward in a diametric direction, the other one of the opposite free ends which is bent outward in a diametric direction so as to form a ring through which one of the opposite free ends passes and which includes a bulging lip disposed on an inner periphery of the ring and bulging inward in a diametric direction; and a fixing member for connecting the one of the opposite free ends of the clamping main body with the other one of the opposite free ends thereof; and including:

a major portion to be installed to the one of the opposite free ends of the clamping main body; and a tongue portion extending from the major portion in a direction around an axis of a hose member, passing through the ring-shaped other opposite free end of the clamping main body, and including an engager hole for receiving the bulging lip of the clamping main body therein;

the engager hole being formed as a slot so that, when it is engaged with the bulging lip of the clamping main body, it inhibits the opposite free ends of the clamping main body from separating in a direction separating the opposite free ends away from each other, and that it allows the bulging lip of the clamping main body to move therein in a direction approaching the opposite free ends to each other.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 1 is a perspective view of a First Preferred Embodiment of a hose clamp according to the present invention; a FIG. 2 illustrates various views of the First Preferred Embodiment of the present hose clamp illustrated in FIG. 1, wherein:

FIG. 2 (B) is a side view thereof;

FIG. 5 illustrates various views of a Second Preferred Embodiment of a hose clamp according to the present invention, wherein:

FIG. 5 (A) is a side view thereof; and

FIG. 5 (B) is a perspective view thereof; and

DETAILED DESCRIPTION OF THE PREFERRED EMBODIMENTS

Figure 1:
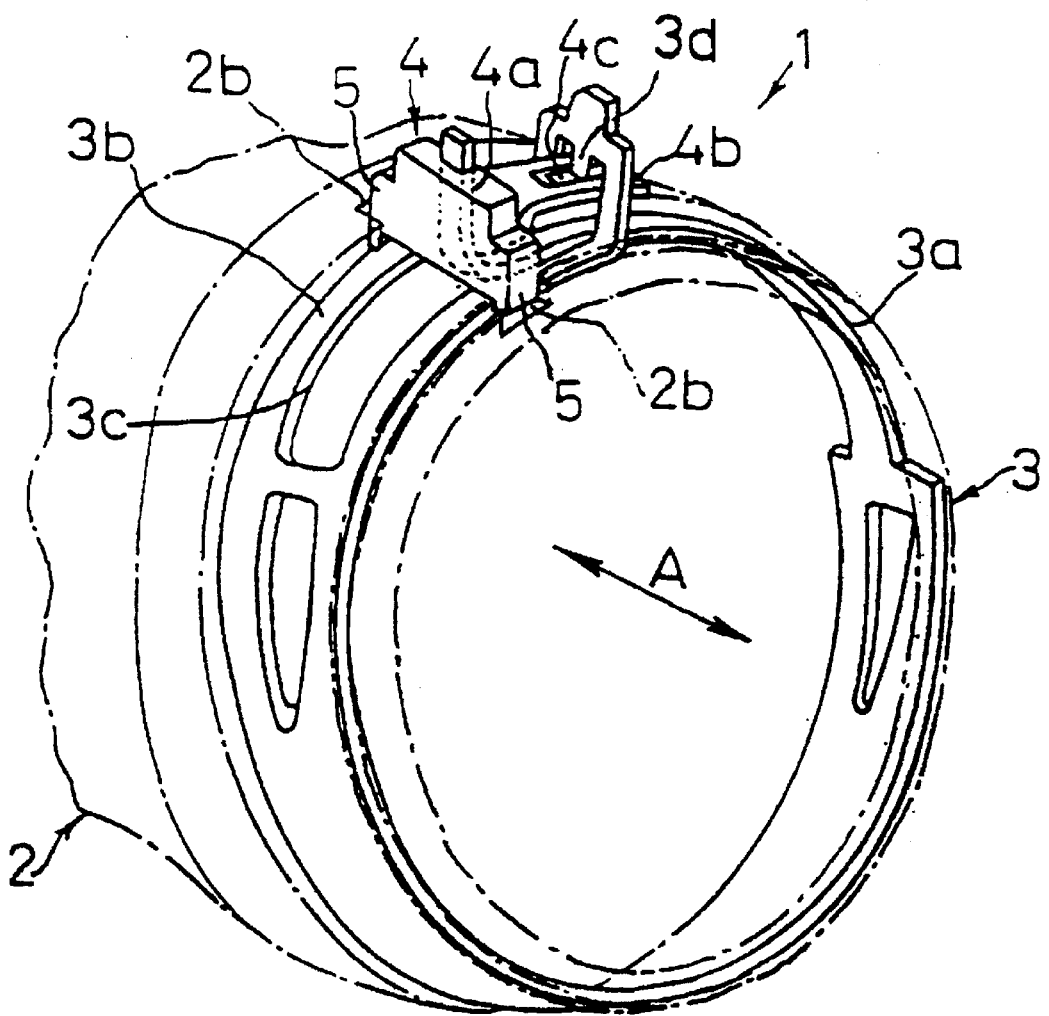

Having generally described the present invention, a further understanding can be obtained by reference to the specific preferred embodiments which are provided herein for purposes of illustration only and are not intended to limit the scope of the appended claims.

First Preferred Embodiment

A hose clamp will be hereinafter described in detail with reference to a First Preferred Embodiment which is applied in tightening an air cleaner hose. FIGS. 1 through 4 illustrates the First Preferred Embodiment of the present hose clamp. In the First Preferred Embodiment, a hose clamp 1 comprises a clamping main body 3, and a fixing member 4. The clamping main body 3 tightens one of the opposite ends of a hose member 2, and has a circled-strip shape. The fixing member 4 fastens the opposite free ends of the clamping main body 3 prior to the tightening operation of the hose member 2.

The clamping main body 3 is made by cutting a strip-shaped steel material to a predetermined dimension and by bending it to a circle-like shape. The bending operation gives the clamping main body 3 an urging force which is exerted to reduce the diameter of the clamping main body 3 in a direction around the axial direction "A" of the hose member 2. On one of the sides of the clamping main body 3, which includes one of the opposite free ends thereof, there is disposed a minor-width portion 3a which is formed by removing the both ends with respect to the width-wise direction over a specified length. On the other sides of the clamping main body 3, which includes the other one of the opposite free ends thereof, there is disposed a ring portion 3b over a prescribed length. The ring portion 3b is cut at the central portion so that it includes a slot 3c. The minor-width portion 3a overlaps with the ring portion 3b, and thereby it fits into the slot 3c of the ring portion 3b. Further, as illustrated in FIG. 2 (B), the leading end of the minor-width portion 3a (i.e., one of the opposite free ends of the clamping main body 3) is bent to project in a radial direction away from the slot Furthermore, as also illustrated in FIG. 2 (B), the leading end of the ring portion 3b (i.e., the other one of the opposite free ends of the clamping main body 3) is bent to project in a radial direction away from the minor-width portion 3a.

Figure 2A:
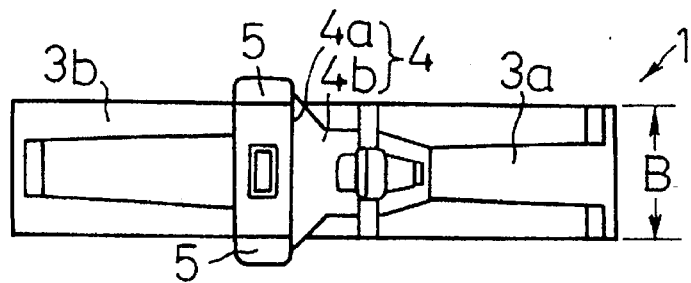
FIG. 2 (A) is a plan view thereof.
Figure 2B:
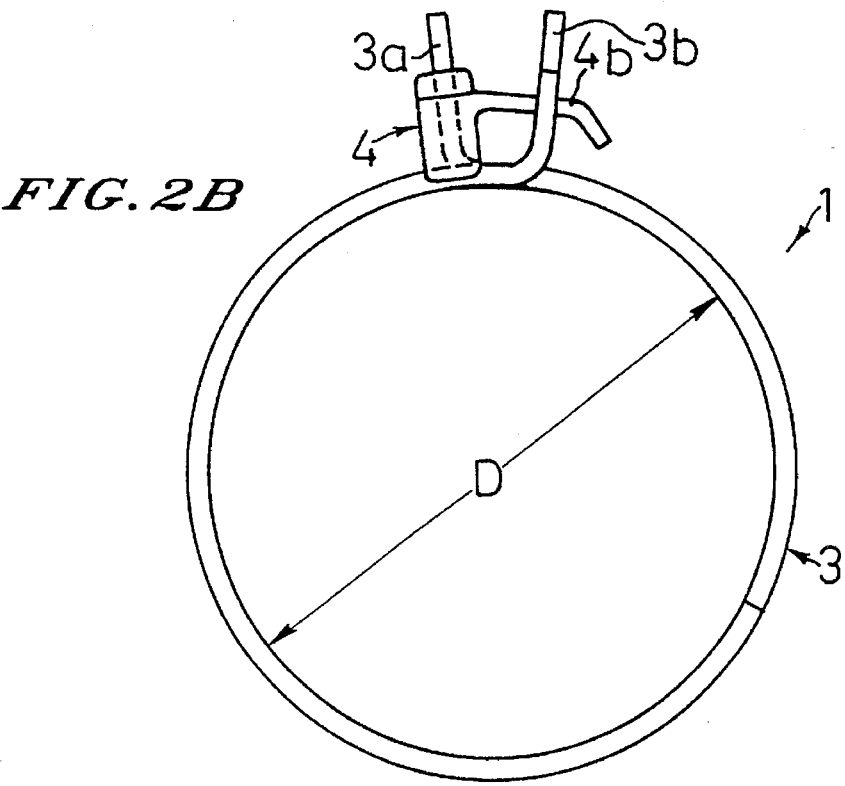

As shown in FIG. 1 or FIG. 2 (A), the fixing member 4 comprises a major portion 4a, and a tongue portion 4b. The major portion 4a is installed to the clamping main body 3 by fitting the leading end of the minor-width portion 3a therein. The tongue portion 4b extends from the major portion 4a in a direction around the axial direction "A" of the hose member 2.

Figure 3:
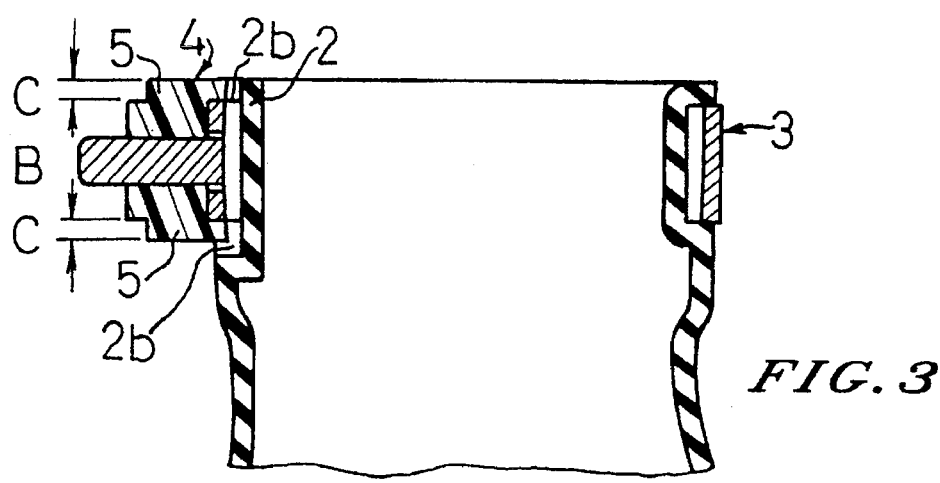
FIG. 3 illustrates a cross-sectional view of the First Preferred Embodiment of the present hose clamp illustrated in FIG. 1 and tightening a hose member.

The major portion 4a further includes projections 5, 5 which are disposed on the both sides with respect to the axial direction "A" of the hose member 2. The projections 5, 5 extend in the direction "A" in a predetermined dimension (hereinafter referred to as a "projected dimension "C""). As illustrated in FIG. 2 (A) or FIG. 3, the width of the major portion 4a involving the projected dimensions "C" of the projections 5, 5 is set larger than the width "B" of the clamping main body 3. As hereinafter described in detail, either one of the projections 5, 5 engages with a groove 2a which is adapted for being assembled with the hose clamp 1, and which goes around in a direction around the axial direction "A" of the hose member 2. Accordingly, the hose clamp 1 is placed at a certain position with respect to the hose member 2, and inhibited from moving about the position. Specifically, as identified by alternate-long-and-dash line of FIG. 1 or as shown in FIG. 3, the hose member 2 is provided with concavities 2b, 2b in the axial direction "A." The concavities 2b, 2b are disposed at a position where it engages with either one of the projections 5, 5 of the fixing member 4. For instance, the concavities 2b, 2b are designed and formed to be at a position in a direction around the axial direction "A" of the hose member 2, position where an operator can carry out the tightening operation with ease when the hose member 2 and the hose clamp 1 are actually assembled together.

The tongue portion 4b of the fixing member 4 has resilience, and includes an engager hole 4c which is formed at the central portion. Prior to the tightening operation, the engager hole 4c engages with the leading end of the ring portion 3b.

The fixing member 4 can be made by insert molding. For example, a stainless steel material, constituting the major portion of the tongue portion 4b, is disposed in a mold, and the major portion 4a is molded with resin over the tongue portion 4b by injection molding.

The thus constructed hose clamp 1 can be used, for example, as an element for tightening an air cleaner hose. If such is the case, the hose member 2 is manufactured by means of blow molding, and thereby it is provided with the above-described groove 2a and the concavities 2b, 2b at the opposite ends. The hose clamp 1 is temporarily held in the groove 2a of the hose member 2.

When temporarily holding the hose clamp 1 onto the hose member 2, the diameter "D" (shown in FIG. 2 (B)) of the clamping main body 3 is enlarged so that it is slightly larger than the diameter of the groove 2a. This diameter-enlarging operation can be carried out as follows; namely: the major portion 4a of the fixing member 4 is fitted over the leading end of the minor-width portion 3a, which is bent radially outward, of the clamping main body 3. Subsequently, the diameter of the clamping main body 3 is enlarged so that the leading end of its ring portion 3b is engaged with the engager hole 4c of the fixing member 4. The term "leading end of its ring portion 3b" means the bulging lip, which bulges inward in a diametric direction of the ring portion 3b, and is hereinafter referred to as an "inward-bulging lip 3d". When the inward-bulging lip 3d of the ring portion 3b is engaged with the engager hole 4c, the opposite free ends of the clamping main body 3 are fastened with the fixing member 4. Thus, the diameter "D" of the clamping main body 3 is slightly larger than the diameter of the groove 2a of the hose member 2.

Figure 4:
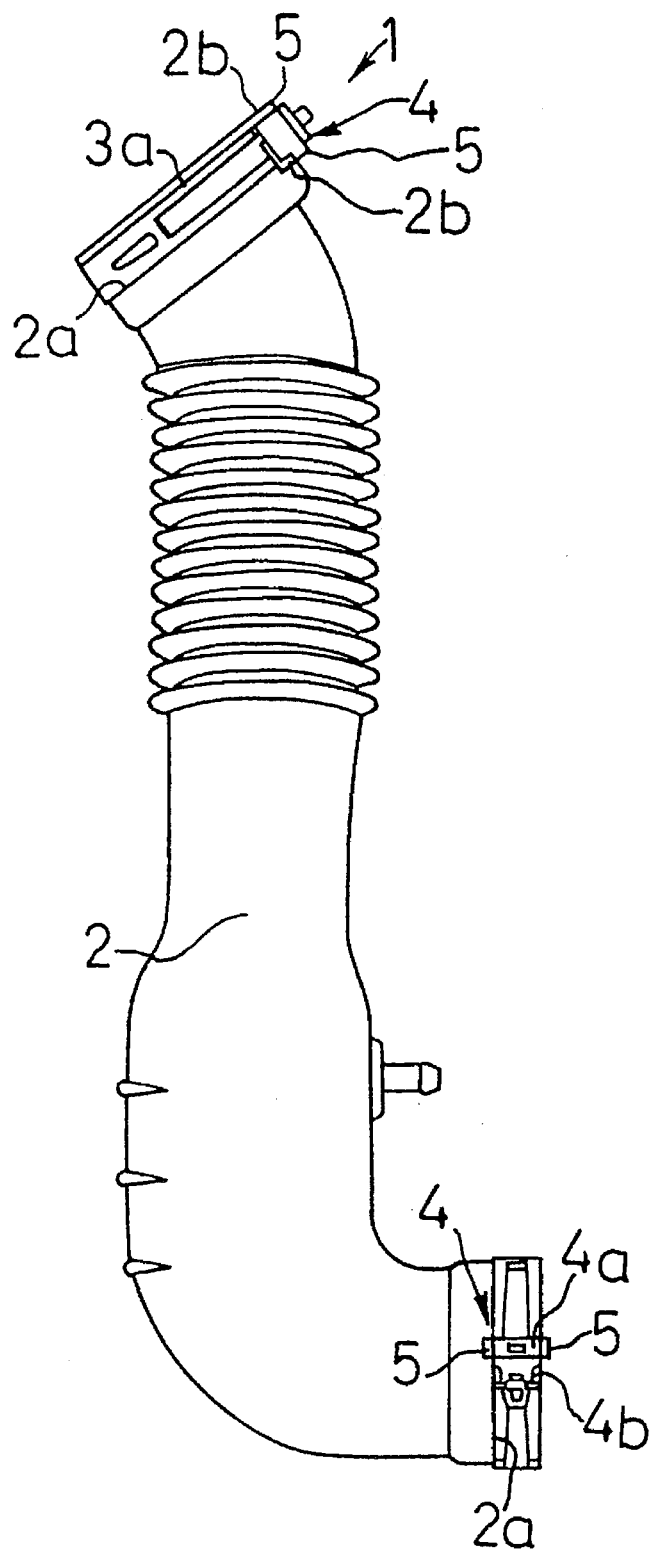
FIG. 4 illustrates a plan view of an inlet hose to which the First Preferred Embodiment of the present hose clamp illustrated in FIG. 1 is installed temporarily at the opposite ends.

The hose clamp 1 comprising the clamping main body 3 whose diameter is enlarged to "D" is then installed onto the groove 2a of the hose member 2. When carrying out this installation, the clamping main body 3 and the hose clamp 1 are rotated in a direction around the axial direction "A" of the hose member 2 and the projections 5, 5 of the fixing member 4 are engaged with the concavities 2b, 2b of the hose member 2 so as to control the movement of the hose clamp 1 to the hose member in a peripheral direction because of two opposite wall surfaces 2c, 2c opposed in a peripheral direction of the concavities 2b, 2b. As a result, the hose clamp 1 is positioned. Thus, as illustrated in FIG. 4, the temporary installation of the hose clamp 1 onto the hose member 2 is completed.

The hose member 2 with the hose clamps 1 held temporarily thereto is fitted into an air cleaner and a throttle body at the opposite ends. After this fitting operation is finished, the diameter of the clamping main body 3 is reduced in order to tighten the opposite ends of the hose member 2. The tightening operation can be carried out by simply pressing the tongue portion 4b of the fixing member 4 inwards in the diametric direction. When the tongue portion 4b is pressed inwards in the diametric direction, the ring portion 3b of the clamping main body 3 is separated from the engager hole 4c. Thus, the clamping main body 3 tightens the opposite ends of the hose member 2 by the urging force which stems from its reducing diameter.

Note that, when the hose member 2 is actually installed to an air cleaner, the fixing member 4 is designed to be positioned so that the concaved portions 2b, 2b can be positioned at a place where an operator can easily work with them, or where an operator can visually identify them clearly. Hence, it is possible for an operator to apply a jig which is adapted for pressing the tongue portion 4b of the fixing member 4 inwards in the diametric direction.

In addition, when putting the hose clamp 1 back into the temporary installation, the inward-bulging lip 3d of the ring portion 3b of the clamping main body 3 and the leading end of the minor-width portion 3a thereof are held by a spanner, or the like, and thereby they are approached to each other so as to reduce the distance between them.

As having been described so far, in the present hose clamp 1, the engagement of the projections 5, 5 of the fixing member 4 with the concavities 2b, 2b of the hose member 2 results in the completion of the positioning of the clamping main body 3 in a direction around the axial direction "A" of the hose member 2. Accordingly, it is possible for an operator to carry out the tightening of the hose member 2 with remarkable readiness.

Further, in a direction around the axial direction "A" of the hose member 2, the positioning of the clamping main body 3 is performed by the fixing member 4 which is disposed independently of the clamping main body 3. As a result, even when the diameter of the hose member 2 is varied, the width, thickness, etc. of the clamping main body 3 can be kept at a predetermined dimension. Therefore, even when the diameter of the hose member 2 is varied, it is possible to manufacture the clamping main body 3 out of a common strip-shaped material.

Furthermore, even when it is needed to vary the projected dimension "C" of the projections 5, 5, it is necessary to vary the specifications of the fixing member 4 only. Note that, if such is the case, it is unnecessary to vary the specifications of the clamping main body 3.

Second Preferred Embodiment

Figure 5A:
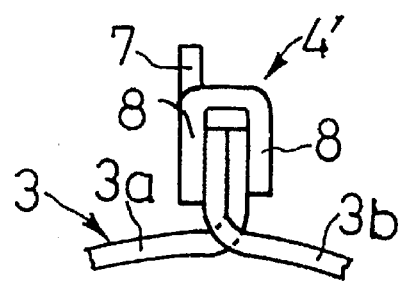
Figure 5B:
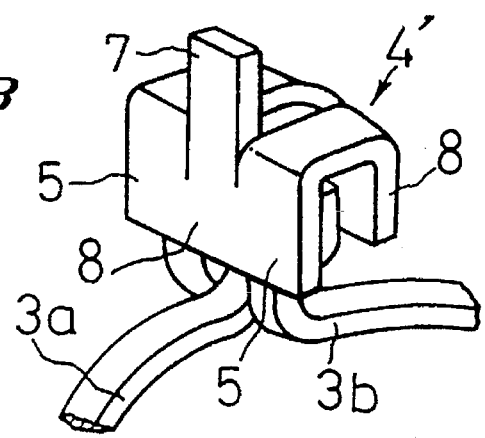

FIG. 5 illustrates a Second Preferred Embodiment of a hose clamp according to the present invention. In the Second Preferred Embodiment, as illustrated in FIG. 5, a fixing member 4' substitutes for the fixing member 4 of the First Preferred Embodiment. The fixing member 4' holds the opposite free ends of the clamping main body 3 of the hose clamp 1. The fixing member 4' can be manufactured by bending a small rectangle-shaped steel plate into a letter "U" shape in cross-section, and thereby it is provided with opposite lips 8, 8 on the both sides. Further, the fixing member 4' is provided with an upright lip 7 which is formed by stamping out a central portion of the steel plate. Furthermore, the opposite lips 8, 8 of the fixing member 4' are provided with projections 5, 5, thereby increasing the axial length of the opposite lips 8, 8 larger than the widthwise length of the clamping main body 3. Thus, similarly to the first preferred embodiment, the projections 5, 5 are engaged with the concavities 2b, 2b of the groove 2a of the hose member 2.

In the Second Preferred Embodiment, prior to the tightening operation, the opposite free ends of the clamping main body 3 of the hose clamp 1 are held between the opposite lips 8, 8 of the fixing member 4'. Then, after the hose clamp 1 is positioned by engaging the projections 5, 5 with the concavities 2b, 2b, the Then fixing member 4' is removed is removed at the time of the tightening operation.

The thus constructed fixing member 4' of the Second Preferred Embodiment produces the same advantageous effects as those produced by the First Preferred Embodiment. In addition, the fixing member 4' can be manufactured remarkably easily.

Note that, in the First and Second Preferred Embodiments, either one of the projections 5, 5 can be formed on either one of the sides of the fixing member 4 or 4' with respect to the axial direction "A" of the hose member 2.

Figure 6:
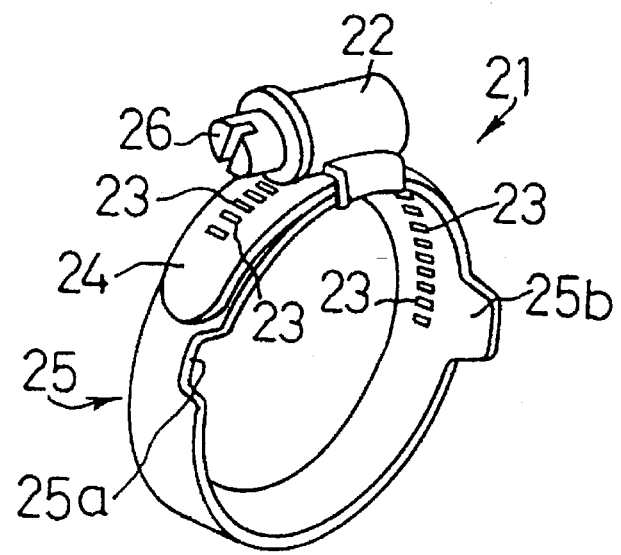
FIG. 6 is a perspective view for illustrating a conventional hose clamp.

Moreover, the conventional screw-type hose clamp illustrated in FIG. 6 can be operatively provided with a projection in order to fulfill the present invention.

Having now fully described the present invention, it will be apparent to one of ordinary skill in the art that many changes and modifications can be made thereto without departing from the spirit or scope of the present invention as set forth herein including the appended claims.

What is claimed is:

1. A hose clamp, comprising:

a clamping main body for clamping a hose member having a concavity which is formed by two opposite wall surfaces formed from an outer periphery of said hose member outward in a diametric direction and opposed in a peripheral direction, and an outer periphery surface of said hose member, the clamping main body formed by winding a strip-shaped steel in a circle shape more than once, adapted to be disposed around a hose member about an axis of the hose member, being capable of exhibiting an urging force for reducing its diameter, and formed as a circled-strip having opposite free ends, the concavity for positioning formed by removing an outer periphery of said hose member which said clamping main body clamps;

a fixing member disposed independently of said clamping main body, engaged with the opposite free ends of said clamping main body so as to inhibit the diameter of said clamping main body from reducing, and including a projection;

the projection extending at least in one of axial directions of said hose member so as to project from said clamping main body diametric direction, and being disposed between said two opposite wall surfaces of said concavity so as to control a movement of said hose clamp to said hose member in a peripheral direction.

2. The hose clamp according to claim 1, wherein said fixing member further includes a major portion to be installed to at least one of the opposite free ends of said clamping main body, and a tongue portion extending from the major portion in a direction around the axis of said hose member and to be engaged with the other one of the opposite free ends of said clamping main body.

3. The hose clamp according to claim 1, wherein said fixing member further includes opposite lip for holding the opposite free ends of said clamping main body therebetween.

4. The hose clamp according to claim 2, wherein the major portion is made of resin, and the tongue portion is made of metal.

5. The hose clamp according to claim 4, wherein the projection is formed on the major portion.

6. The hose clamp according to claim 5, wherein the major portion of said fixing member includes a pair of said projections disposed on both sides thereof with respect to the axial direction of said hose member.

7. The hose clamp according to claim 6, wherein the major portion is extended in a width direction of said clamping main body beyond both sides of said clamping main body so that it bridges in the width direction over said clamping main body.

8. The hose clamp according to claim 7, wherein the metal-made tongue portion is formed in the resin-made major portion by insert molding.

9. The hose clamp according to claim 8, wherein at least one of the opposite free ends of said clamping main body includes a minor-width portion which extends outward in a diametric direction of said clamping main body;

the other one of the opposite free ends of said clamping main body includes a ring portion which extends outward in a diametric direction of said clamping main body;

the major portion of said fixing member includes a hole into which the minor-width portion of said clamping main body is fitted; and the tongue portion of said fixing member includes an engager hole with which the ring portion of said clamping main body is engaged.

10. The hose clamp according to claim 9, wherein the tongue of said fixing member is inhibited from displacing outward in a diametric direction of said clamping main body by being fitted into the ring portion of said clamping main body.

11. The hose clamp according to claim 1, wherein said fixing member includes a pair of said projections which are disposed on both sides thereof with respect to the axial direction of said hose member.

12. The hose clamp according to claim 11, wherein said fixing member further includes a major portion to be installed to at least one of the opposite free ends of said clamping main body; and the major portion is extended in a width direction of said clamping main body beyond both sides of said clamping main body so that it bridges in the width direction over said clamping main body.

13. A hose clamp for clamping a hose member, comprising:

a clamping main body formed by winding a strip-shaped steel in a circle shape more than once, and having opposite free ends;

a fixing member for inhibiting the opposite free ends of said clamping main body from separating, and including:

a major portion made of resin to be installed to one of the opposite free ends of said clamping main body, and having a width which is larger than a strip-width of said clamping main body; and a tongue portion made of resilient metallic plate extending from the major portion in a direction around an axis of a hose member, and including an engager hole to be engaged with the other one of the opposite free ends of said clamping main body.

14. The hose clamp according to claim 13, wherein the engager hole of the tongue portion is formed as a slot which allows the other end of the opposite free ends of said clamping main body to move over a predetermined distance therein.

15. A hose clamp, disposed on an outer periphery of a hose member and being tightened against the hose member outer periphery, comprising:

a clamping main body formed by winding a strip-shaped steel in a circle shape more than once, and having opposite free ends and a predetermined width, the clamping main body including one of the opposite free ends which is bent outward in a diametric direction, the other one of the opposite free ends which is bent outward in a diametric direction so as to form a ring through which one of the opposite free ends passes and which includes a bulging lip disposed on an inner periphery of the ring and bulging inward in a diametric direction; and a fixing member for connecting the one of the opposite free ends of said clamping main body with the other one of the opposite free ends thereof; and including:

a major portion to be installed to the one of the opposite free ends of said clamping main body; and a tongue portion extending from the major portion in a direction around an axis of a hose member, passing through the ring-shaped other opposite free end of said clamping main body, and including an engager hole for receiving the bulging lip of said clamping main body therein;

the engager hole being formed as a slot so that, when said clamping main body is engaged with the bulging lip of said clamping main body, said clamping main body inhibits the opposite free ends of said clamping main body from separating in a direction separating the opposite free ends away from each other, and that said clamping main body allows the bulging lip of said clamping main body to move therein in a direction approaching the opposite free ends to each other.

* * * * *